United States Patent
Schuster et al.

(10) Patent No.: US 10,940,405 B2
(45) Date of Patent: Mar. 9, 2021

(54) FILTER ELEMENT FOR FILTERING A FLUID PASSING THROUGH THE FILTER ELEMENT, COALESCENCE FILTER, COMPRESSED AIR FILTER SYSTEM, USE OF FILTER ELEMENT AND A METHOD OF PRODUCING A COALESCENCE FILTER

(71) Applicant: DONALDSON FILTRATION DEUTSCHLAND GMBH, Haan (DE)

(72) Inventors: Hans-Michael Schuster, Haan (DE); Abdelkhalic Rbayti, Düsseldorf (DE)

(73) Assignee: DONALDSON FILTRATION DEUTSCHLAND GMBH, Haan (DE)

( * ) Notice: Subject to any disclaimer, the term of this patent is extended or adjusted under 35 U.S.C. 154(b) by 174 days.

(21) Appl. No.: 16/091,749

(22) PCT Filed: Apr. 7, 2017

(86) PCT No.: PCT/EP2017/000442
§ 371 (c)(1),
(2) Date: Oct. 5, 2018

(87) PCT Pub. No.: WO2017/174199
PCT Pub. Date: Oct. 12, 2017

(65) Prior Publication Data
US 2019/0151775 A1    May 23, 2019

(30) Foreign Application Priority Data
Apr. 7, 2016   (DE) .................. 10 2016 003 994.9

(51) Int. Cl.
*B01D 17/04*   (2006.01)
*B01D 46/00*   (2006.01)
(Continued)

(52) U.S. Cl.
CPC ........... *B01D 17/045* (2013.01); *B01D 17/10* (2013.01); *B01D 46/0031* (2013.01); *B01D 46/525* (2013.01); *B01D 46/527* (2013.01)

(58) Field of Classification Search
CPC .............. B01D 46/0031; B01D 46/525; B01D 46/527; B01D 17/045; B01D 17/10
See application file for complete search history.

(56) References Cited

U.S. PATENT DOCUMENTS

| 4,692,175 A | 9/1987 | Frantz |
| 4,818,257 A | 4/1989 | Kennedy et al. |

(Continued)

FOREIGN PATENT DOCUMENTS

| DE | 68919860 T2 | 5/1995 |
| EP | 0618835 A1 | 10/1994 |

(Continued)

OTHER PUBLICATIONS

International Search Report and Written Opinion for PCT/EP2017/000442, dated Jul. 7, 2017.

(Continued)

*Primary Examiner* — Robert Clemente
(74) *Attorney, Agent, or Firm* — Merchant & Gould P.C.

(57) ABSTRACT

The invention relates to a filter element for filtering a fluid passing through the filter element with a group of first channels, in which each first channel extends from a first end to a second end and each first channel has on its first end an inlet opening through which the fluid to be filtered can flow into the respective first channel and is closed at its second end, and a group of second channels, in which each second channel extends from a first end to a second end and each second channel has at its second end an outlet opening through which the filtered fluid can flow out of the respective second channel and is closed at its first end, wherein at least (Continued)

one first channel is arranged adjacent to a second channel and the first channel is separated from the second channel by a partition wall, wherein the partition wall is formed of a filter medium through which the fluid to be filtered can flow from the first channel into the second channel, wherein the filter medium is a coalescence filter medium.

10 Claims, 4 Drawing Sheets

(51) Int. Cl.
*B01D 46/52* (2006.01)
*B01D 17/00* (2006.01)

(56) References Cited

U.S. PATENT DOCUMENTS

| | | | |
|---|---|---|---|
| 5,129,923 A | 7/1992 | Hunter et al. | |
| 5,795,369 A | 8/1998 | Taub | |
| 6,179,890 B1 | 1/2001 | Ramos et al. | |
| 6,932,850 B1 | 8/2005 | Welch et al. | |
| 2004/0060861 A1* | 4/2004 | Winter | B01D 46/0012 210/448 |
| 2007/0107396 A1 | 5/2007 | Zuberi | |
| 2010/0043363 A1* | 2/2010 | Patel | B01D 46/2411 55/323 |
| 2016/0361674 A1* | 12/2016 | Swaminathan | B01D 39/04 |

FOREIGN PATENT DOCUMENTS

| | | |
|---|---|---|
| GB | 1557821 A | 12/1979 |
| WO | 94/05396 A1 | 3/1994 |
| WO | 2008/125333 A1 | 10/2008 |
| WO | 2010/017407 A1 | 2/2010 |

OTHER PUBLICATIONS

International Preliminary Report on Patentability for PCT/EP2017/000442, dated May 14, 2018.

* cited by examiner

FILTER ELEMENT FOR FILTERING A FLUID PASSING THROUGH THE FILTER ELEMENT, COALESCENCE FILTER, COMPRESSED AIR FILTER SYSTEM, USE OF FILTER ELEMENT AND A METHOD OF PRODUCING A COALESCENCE FILTER

This application is a U.S. National Stage application of PCT International Patent application No. PCT/EP2017/000442, filed Apr. 7, 2017, which claims priority to European Patent Application No. 102016003994.9, filed Apr. 7, 2016, which applications are incorporated herein by reference. To the extent appropriate, a claim of priority is made to each of the above disclosed applications.

The invention relates to a filter element for filtering a fluid passing through the filter element as well as a coalescence filter, a compressed air filter system and a particular use of the filter element according to the invention. The invention also relates to a method of producing a coalescence filter.

Coalescence filters are known in a variety of designs. The core concept of a coalescence filter is to convey a fluid mixture consisting of a continuous and a dispersed phase through a coalescence filter medium so, that the dispersed phase randomly comes into contact with fibres of the filter medium and remains suspended on these fibres. Coalescence is the process in which the fine droplets combine to form increasingly large drops through coming into contact with each other. Compared with the continuous phase, through their volume they form an every greater resistance through which the drops, partially overcoming adhesion, are pushed along the fibres in the flow direction of the continuous phase through the filter medium. Additionally the effect of sufficiently large drops moving downwards due to gravity can be utilised. The coalescence effect can already set in when a fine droplet comes into contact with the fibres if this place had already been occupied by a previously contacting fine droplet and the two fine droplets combine. Additionally or alternatively the coalescence effect can set in as a result of a droplet, which due to its resistance is already flowing along the fibre driven by the continuous phase and/or as a result of gravity, comes into contact with droplets which are moving more slowly or not at all along the fibre.

Coalescence filters are often also used to specifically "remove" droplets filtered out of the fluid flow so that after flowing through the coalescence filter medium they are not carried along again by the flow and in the worst scenario dispersed. For this a drainage medium is often provided downstream of the coalescence filter medium. This is frequently in close contact with the surface of the coalescence filter medium. The drainage medium has considerably lower density than the coalescence filter medium and therefore also a considerably smaller flow resistance. As a result of this the force with which the drops—being driven by the continuous phase—are propelled along the fibres and thus also the advancing speed of the drops is reduced.

Coalescence filters are often constructed in such a way that the filter medium is aligned vertically and the fluid to be filtered flows through horizontally or at an angle in relation to the vertical. Particularly when drainage layers are provided, this design has the advantage that flowing off of the drops in the above-described drainage layer is specifically supported by gravity and that, following gravity, the fluid drops move downwards if they have a greater density than the continuous phase; if their density is lower the drops move upward through the buoyancy.

Known from WO 2008/125333 A1 is a filter element for a coalescence filter with an outer supporting mantle, a drainage layer and a coalescence filter medium.

From WO 2010/017407 A1 a filter medium that can be used for a filter element is known. The filter element there for filtering a fluid passing through the filter element has a group of first channels, in which each first channel extends from a first end to a second end and each first channel has at its first end an inlet opening through which the fluid to be filtered can flow into the respective first channel and is closed at its second end. In addition, the filter element described there has a group of second channels, in which each second channel extends from a first end to a second end and each second channel has at its second end an outlet opening through which the fluid to be filtered can flow out of the respective second channel and is closed at its first end, wherein at least one first channel is arranged adjacent to a second channel and the first channel is separated from the second channel by a partition wall, wherein the partition wall is formed of a filter medium through which the fluid to be filtered can flow from the first channel into the second channel. In term of the material used for them, the filter media described in WO 2010/017407 are homogenous and in a single-layer. On page 16, lines 10 to 17 of WO 2010/017407 A1 it is described that as the material for the filter medium non-woven fibre material, for example consisting of cellulose fibres, synthetic fibres or both, is used, which frequently also contains a resin as well as possibly other materials. In this paragraph the selection of the filter material is essentially described in terms of its mouldability as WO 2010/017407 A1 essentially concerns itself with possibilities of forming the cross-sectional shape of the first channels and second channels in a particular manner. The filter element described in WO 2010/017407 A1 is not suitable as a coalescence filter. As described on page 44 line 6 ff. of WO 2010/017407 A1 the filter media described there are selected in particular with regard to their dust uptake The filter elements described there are thus filter elements which trap and retain the particles to be filtered out in the filter medium and are not therefore coalescence filters which trap the particles or fluid drops be filtered off, but release them again. These filter elements are therefore exclusively designed for removing solid particles from air/gas. An essential difference with regard to the filter elements described there is that in addition to a coalescence filter medium a coalescence filter also has a drainage layer so that once they are separated the fluid drops cannot re-enter the fluid flow in an uncontrolled manner.

On the basis of WO 2008/125333 A1 the object of the invention was to develop a coalescence filter which filters more effectively or which with the same level of effectiveness requires a smaller installation space. An improved coalescence filter, an improved compressed air filter system/pressurised gas system as well as a use of such a filter element are also to be proposed. In addition an improved method of producing a coalescence filter is to be proposed.

This task is solved by the subject matters of the subsidiary claims. Advantageous forms of embodiment are set out in the sub-claims and the following description.

The invention is based on the underlying idea that the advantages in relation to high effectiveness with a smaller installation space of the filter element designed in accordance with WO 2010/017407 A1 can in principle also be achieved in coalescence filters.

The filter element used in the compressed air filter system according to the invention has a group of first channels, in which each first channel extends from a first end to a second end and each first channel has at its first end an inlet opening through which the fluid to be filtered can flow into the respective first channel and is closed at its second end. The first channels are thus each a "cul de sac". The fluid to be filtered can enter the first channel. However, it can only leave the first channel by passing through a partition wall of the first channel.

The filter element used in the compressed air filter system according to the invention also has a group of second channels, in which each second channel extends from a first end to a second end and, each second channel has at its second end an outlet opening through which the filtered fluid can flow out of the respective second channel, wherein the respective second channel is closed at its first end. The second channels therefore also each form a "cul de sac". They are provided so that the filtered fluid can flow out of their respective outlet openings. However the filtered fluid does not enter the second channels through any further opening, but via a partition wall.

In the filter element, at least one first channel is arranged adjacent to a second channel. The first channel is separated from the second channel by a partition wall, wherein the partition wall is formed of a filter medium through which the fluid to be filtered can flow from the first channel into the second channel.

The invention now envisages that this filter medium, of which the partition wall is formed and through which the fluid to be filtered can flow from the first channel into the second channel, has a coalescence filter medium. A coalescence filter medium is in particular taken to mean a medium which has a porous fibre packing in the case of which drops of liquid contained in the fluid to be filtered statistically come into contact with filter fibres and due to an adhesive force (adhesion) in a first step remain suspended on these filter fibres and form a small drop, wherein further contacting droplets combine with those that are present and form a larger drop, with a reduction in surface area (see coalescence), and run off. In this way coalescence filter media differ from the media known from WO 2010/017407 A1 in that the media described in WO 2010/017407 A1 are primarily designed to trap dust and to retain dust in the filter medium itself.

Compared with conventional coalescence filters as known, for example, from WO 2008/125333 A1, the filter element according to the invention is characterised in that more filter medium can be provided per unit of volume. As can be seen in FIG. 2 of WO 2008/125333 A1 in conventional filter elements a voluminous internal space is provided which surrounds the filter medium. With the filter element according to the invention this room can also be filled with filter medium.

The filter medium comprises several layers. A first layer can be a coalescence filter medium and a second layer can be a drainage medium. The layers can be firmly connected to each other. For example, a multiple-layer filter medium can be produced in that a first layer of a first medium can be firmly connected, through adhesion or sewing, for example in a diamond pattern, to a second layer. However, a multiple-layer filter medium does not have to be produced by the combining of two separate layers. In the production of a medium it is also conceivable to directly provide several layers in this medium. For example, glass fibre mats can be produced which on a first side (in a first layer) have a high density of glass fibre media, but have a low fibre density on the opposite side (the second layer). In the production of such three-dimensional fibre materials a continuous gradient can also be incorporated via the thickness of the material, for example by varying the fibre diameter and/or the fibre quantity.

The second layer can be designed as a so-called "drainage layer". As described above a coalescence filter is characterised in that in it or in one of its layers the fluid droplets to be filtered out coalesce (combine to form larger droplets) from the fluid passing through it. It is now possible that through the fluid flow these larger droplets are transported through the coalescence filter medium in the flow direction. If, on its downstream side, the filter medium has a drainage layer, through this drainage layer further coalescence of the fluid droplets can be promoted and the removal of the coalesced fluid droplets increased further.

The drainage layer directly adjoins a second channel. The coalesced fluid droplets are thus brought into the immediate area of a second channel. However, thanks to the drainage layer the coalesced fluid drops do not enter the second channel due to gravity they move downwards within the drainage layer. It can be envisaged that the coalesced fluid drops emerge from the drainage layer in the immediate vicinity of the outlet opening of the second channel. However, at this point in time the fluid droplets have already become so heavy that they can no longer be carried along by the filtered fluid emerging from the second outlet opening and fall into a collection container provided underneath the filter element.

In an alternative form of embodiment the invention envisages a drainage medium arranged separately from the filter medium. A form of embodiment is thus conceivable in which the filter medium arranged between the channels comprises a coalescence filter medium, for example a single-layer, but possibly also a multiple-layer coalescence filter medium, but has no drainage layer and a drainage layer is provided at another location of the filter element. For example, a drainage medium can be arranged in the area of the outlet opening of the second channel. Alternatively a layer of drainage medium is provided as part of the filter medium and this is formed by a further drainage medium provided separately of the filter medium, for example one which is arranged in the area of the outlet opening of the second channel.

In a particularly preferred form of embodiment the coalescence filter medium is a glass fibre medium or the coalescence filter medium has a layer of glass fibre medium. Glass fibre medium is preferably used for high-performance coalescence filtration as the typically three-dimensional fibre structure of micro- and sub-microtine boron silicate or quartz glass fibres makes extraordinarily high degrees of separation in coalescence filtration possible. More particularly the glass fibre medium has a porosity of more than 90%, in particular of more than 93%, and degrees of separation of over 90%. Filter media are often sub-divided according to their degree of separation. In the field of so-called suspended matter filters, to which these high-performance coalescence filters belong, DIN EN 1822-1 provides, among other things, a classification which classifies the filters into filter groups EPA (high-performance particle filters), HEPA (suspended matter filters) and ULPA (high-performance suspended matter filters) and defines filter classes of E10 (degree of separation>=85%) to U17 (degree of separation>=99.999995%). In a preferred form of embodiment a coalescence filter medium has at least one layer of a filter medium of such a suspended matter class, preferably several layers, wherein each layer can be either of a filter medium of the same suspended matter filter classes, or, in an alternative form of embodiment layers of filter media of different suspended matter filter classes.

In a preferred form of embodiment the filter medium has a first layer of a one or more layered glass fibre medium and a second layer of a glass fibre and/or polyester medium. In a preferred form of embodiment the coalescence filter medium has a first layer of a microfibre fleece which is arranged closer to the first channel and a second layer, designed as a drainage layer, which is arranged closer to the second channel.

The coalescence filter medium has preferably undergone a surface treatment which supports the coalescence effect and at the same time minimises the differential pressure of fluid-wetted filter medium. This surface treatment preferably takes place with chemicals which change the creep of water and/or oil on the fibre surfaces. In this way hydrophilic or hydrophobic and/or lipophilic or lipophobic properties can be produced.

In a preferred form of embodiment, in a plane that is perpendicular to the longitudinal axis extending from the respective first end to the second end of the respective channel, at least one of the first channels of the group of first channels and/or one of the second channels of the group of second channels has a triangular or a circular sector or segment-shaped cross-section. Particularly preferably all the channels of a respective group are designed identically. In a particularly preferred form of embodiment the geometry of the first channels and the geometry of the second channels corresponds to the geometries described for these channels in WO 2010/017407 A1. The geometric design possibilities of the channels as described in WO 2010/017407 A1, more particularly under the heading "Flute Shape" on page 24, line 28 to page 35, line 16, are included by reference in the description of the present invention and form part of the description of the possible geometric shapes of the first channels and second channels for describing the present invention. The possibilities for the geometric design of the volume of the channels as described in WO 2010/017407 A1, more particularly under the heading "Flute Volume Asymmetry" on page 35, line 17 to page 37, line 18, are included by reference in the description of the present invention and form part of the description of the possible geometric shapes of the first channels and second channels for describing the present invention. The possibilities for designing the closure of the channels at their closed ends as described in WO 2010/017407 A1, more particularly under the heading "Flute Closure" on page 37, line 20 to page 42, line 16, are included by reference in the description of the present invention and form part of the description of the possible closure of the first channels and second channels for describing the present invention. The possibilities for designing the plug of the channels at their closed ends as described in WO 2010/017407 A1, more particularly under the heading "Plug Length and Flute Height" on page 42, line 18 to page 44, line 3, are included by reference in the description of the present invention and form part of the description of the possible closure of the first channels and second channels for describing the present invention.

Each first channel is arranged adjacent to two second channels. The first channel is separated from the first of the two second channels by a first partition wall. Furthermore, the first channel is separated from the second of the two second channels by a second partition wall and the second partition wall is formed of a filter medium through which the fluid to be filtered can flow from the first channel into the second channel. Particularly preferably the filter medium is a coalescence filter medium.

A back element is provided on which the partition wall separating the first channel from the second channel is fastened in such a way that the first channel is delimited by a surface section of the back element and the surface(s) of the partition wall(s) facing it. Particularly preferably the first channels are only delimited by one surface section of the back element and the surface(s) or the partition wall(s) facing it.

In a preferred form of embodiment all first channels of the group are delimited by a surface section of the back element assigned to the respective first channel. Particularly preferably there is only one single back element which is adjoined by all first channels.

In a preferred embodiment, the filter element can hence be seen as a filter media pack (=the filter element) comprising fluted media (which provides the partition walls between the first channels and the second channels) secured to facing media (the back element) and defining inlet flow channels (preferably the first channels) and outlet flow channels (preferably the second channels) extending between first flow surfaces (preferably the first end) and second, opposite, flow surfaces (preferably the second end).

In a preferred embodiment, the filter element can hence be seen as a filtration media comprising filter media defining first flow faces (preferably the first end) and second, opposite, flow faces (preferably the second end) having a set of flutes closed proximate the second flow face (preferably the first channels) and a set of flutes closed proximate the first flow face (preferably the second channels).

In a preferred form of embodiment the filter element is cylindrical in design and extends along a longitudinal axis. The longitudinal axes of a first and/or a second channel extending from the respective first end to the second end of the respective channel are arranged in parallel to the longitudinal axis of the filter element. In the case of the first channels formed by fastening the partition walls to the back element, the filter element can be formed by winding the back element with the first channels arranged thereon. The second channels can be delimited by the partition walls and the next layer of the wound on back element.

The coalescence filter used in the compressed air filter system according to the invention comprises a filter element. A coalescence filter is taken to mean the component group with the connections and the housing into which the filter element for filtering the fluid passing through the filter element is inserted or wherein it is located. In a preferred form of embodiment the filter element is arranged in a housing of a coalescence filter. This can be achieved in that the housing of the coalescence filter can be opened so that access to the filter element is made possible.

The compressed air system according to the invention comprises a coalescence filter and a filter element as defined by claim 1.

The filter element according to the invention can be used in particular in the filtering of air, especially in the filtering of air containing fluid aerosols or when filtering a fluid in which drops of a second fluid are suspended.

A method for producing a coalescence filter envisages the introduction of a filter element into a coalescence filter when the housing is open and closing of the housing. Forms of embodiment of the method are conceivable in which the coalescence filter has a basic housing body and a cover. In the case of such a design the method according to the invention can envisage that the filter element is inserted into the basic body of the housing and the housing is then closed by placing the cover on it. It is also conceivable that the filter element is attached to the cover (often also known as the head) and the coalescence filter is produced in that the cover and the basic body of the housing are moved relative to each other, i.e. in particular the basic body of the housing is moved onto the cover or the cover is moved onto the basic body of the housing or both the cover and the basic body of the housing are moved onto each other.

In particular the filter element has the advantage that in comparison with conventional coalescence filters its takes up a smaller volume while retaining the same filter performance. The advantages of the invention are put into practice each time such a filter element is used in the manufacturing of a coalescence filter. Forms of embodiment are conceivable in which the cover of a coalescence filter has a connection geometry for connecting to a filter element, wherein this connection geometry is also suitable for connection to a conventional coalescence filter, for example for connection of a coalescence filter as is known from WO 2008/125333 A1. The volume taken up by the coalescence filter with such a cover depends on which filter element and which basic housing body is attached to the cover. If during the course servicing a coalescence filter the filter element according to the invention is removed, there is always the possibility of a filter element which is not in accordance with the invention being incorporated and thus making it a coalescence filter which is not in accordance with the invention. This has the drawback that either the volume of the coalescence filter is considerably increased if the same separation performance and same pressure loss are to be retained, or the separation performance decreases considerably and the pressure loss increases if the same volume is to be retained, Only when a filter element according to the invention is build in are the volumetric advantages as well as the advantages relating to the separation performance and pressure loss at small volume achieved. For this reason the advantages of the invention are always newly assured when replacing a filter element as described above, for example in the case or servicing.

The installation space taken up by the coalescence filter, which directly depends on the volume of the filter element, also has an effect on the assembly stages of a coalescence filter. In the built-in state of a fluid filter system coalescence filters are often completed through incorporating a filter element into the coalescence filter and are regularly provided with a new filter element during servicing. Usually the space that may be taken up by a fluid filter system, more particularly a compressed air filter system, is very limited. Frequently there are other components, in particular further pipelines, in the immediate vicinity of a coalescence filter. These limit the spaces in that a basic housing body of a coalescence filter can be removed from a cover (head) of a coalescence filter. As the filter element described above has a small installation space, during assembly the advantages, in particular the reduction in the distance the basic body of the housing and the cover of the coalescence filter have to be removed from each other, are newly assured each time if a coalescence filter according to the invention is provided with a filter element described above.

The invention will be described below with the aid of only one drawing showing one example of embodiment of the invention in more detail. In this:

Figure 1:
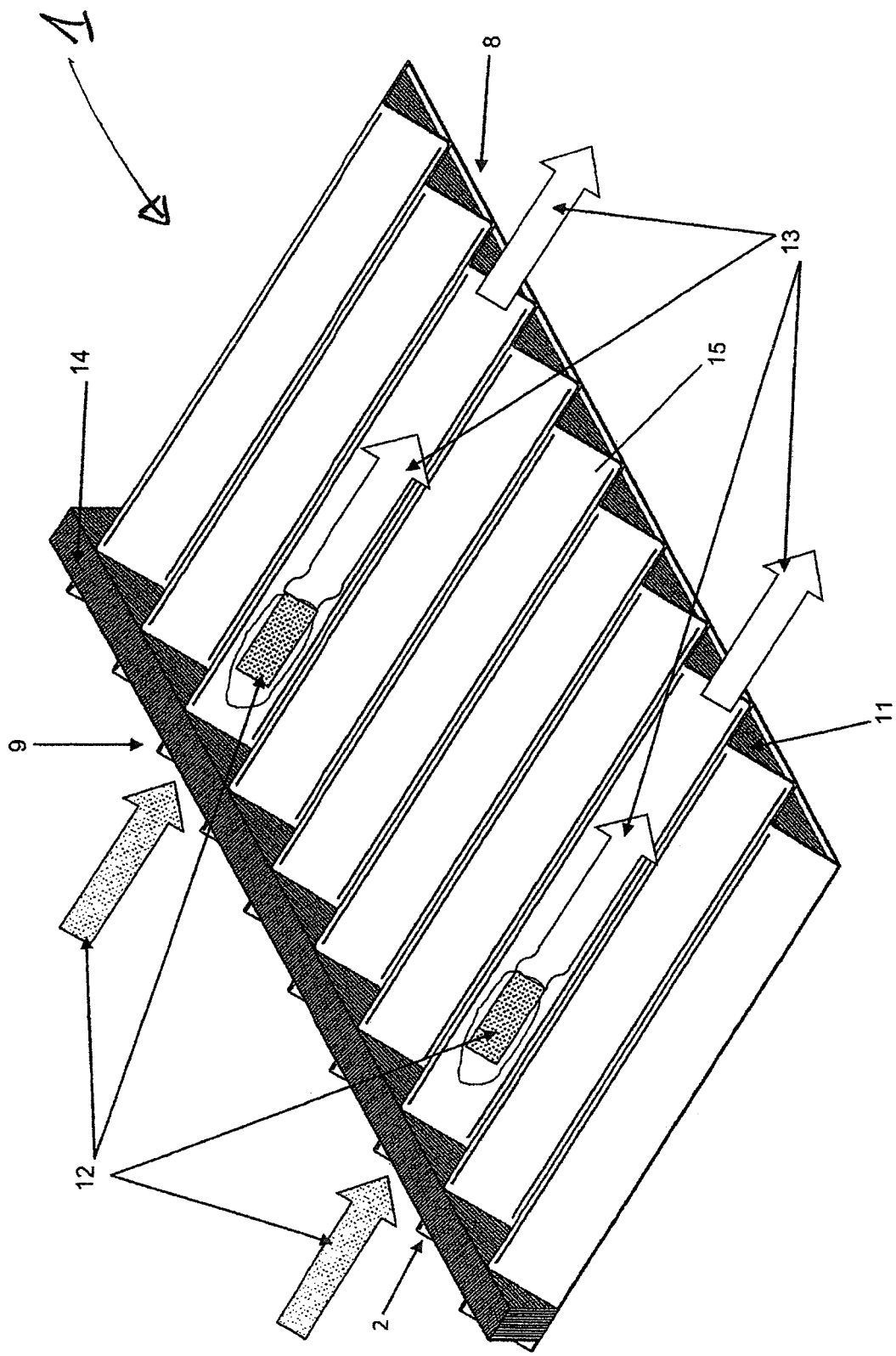
FIG. 1 shows a perspective view of a section of the filter element.
Figure 2:
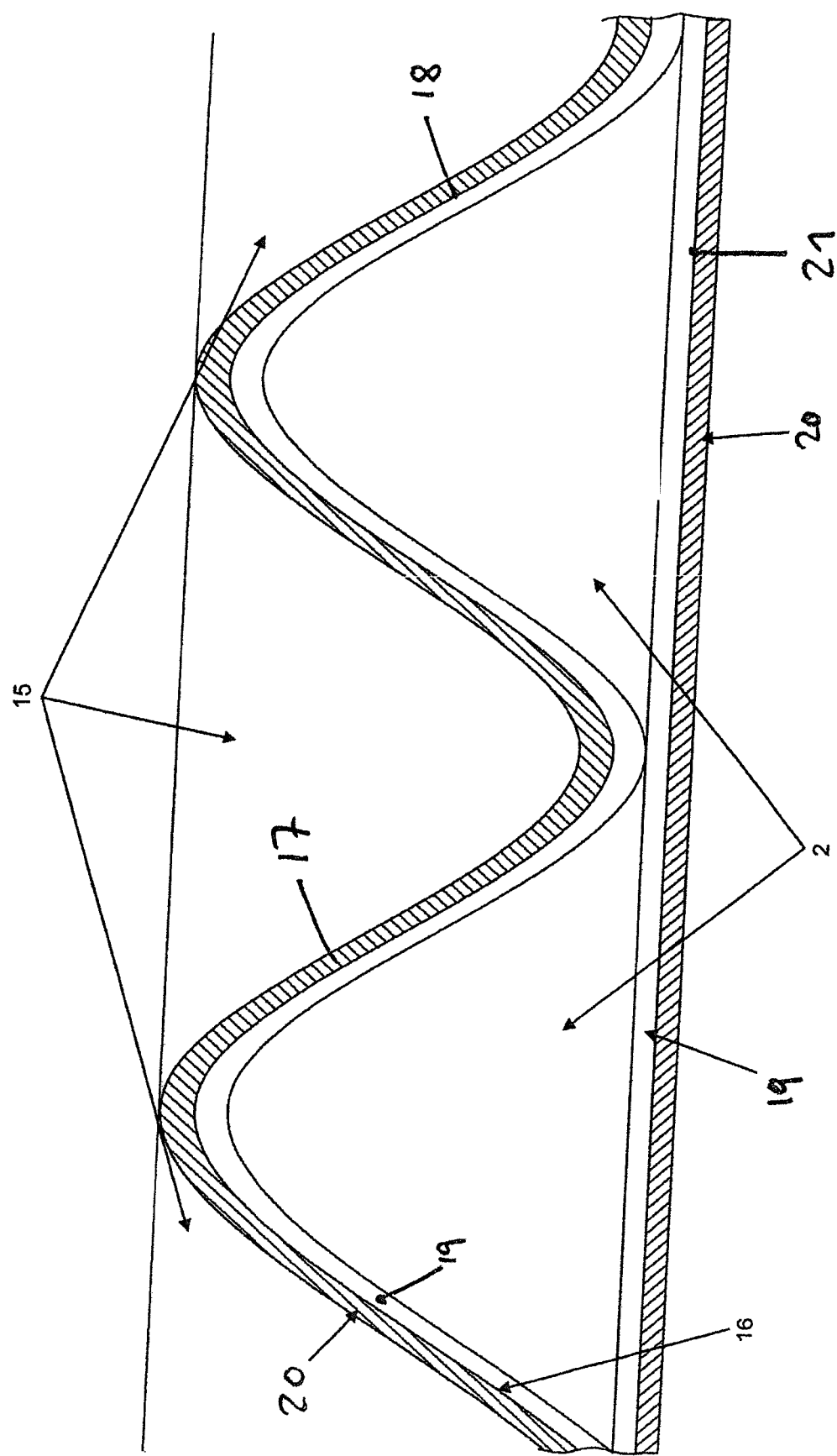
FIG. 2 shows a cross-section through a part of the filter element according to FIG. 2.

The filter element 1 according to the invention for filtering a fluid 12 passing through the filter element has a group of first channels 2, in which each first channel 2 extends from a first end 9 to a second end 8 and each first channel has at its first end 9 an inlet opening through which the fluid 12 to be filtered flow into the respective first channel 2. The first channels 2 are closed at their second ends 8 by a sealing compound 11.

The filter element 1 also comprises a group of second channels 15, in which each second channel 15 extends from a first end 9 to a second end 8 and each second channel 15 has at its second end 8 an outlet opening through which the filtered fluid 13 can flow out of the respective second channel 15 and is closed at its first end 9 by a sealing mass 14.

Each first channel 2 is arranged adjacent to a second channel 15. The first channel 2 is arranged to be adjacent to two second channels 15. This respective first channel 2 is separated from the first of the two second channels 15 by a first partition wall 16. The first channel 2 is separated from the second of the two second channels 15 by a second partition wall 17. The first partition wall and the second partition wall are each formed of a, more particularly the same, filter medium 18 through which the fluid to be filtered can flow from the first channel into the second channels.

The filter medium 18 comprises a two-layer filter medium. Here the first layer 19 is a coalescence filter medium in the form of a glass fibre medium and the second layer 20 is a drainage medium.

The filter element shown in the figures has a back element 21 on which partition wall 16, 17 separating the first channel 2 from the second channel 15 is fastened in such a way that the first channel is delimited by a surface section of the back element 21 and the surfaces of the partition walls 16, 17 facing it. The back element 21 is made of the same two-layer filter medium as the first partition wall 16 and the second partition wall 17.

Figure 3:
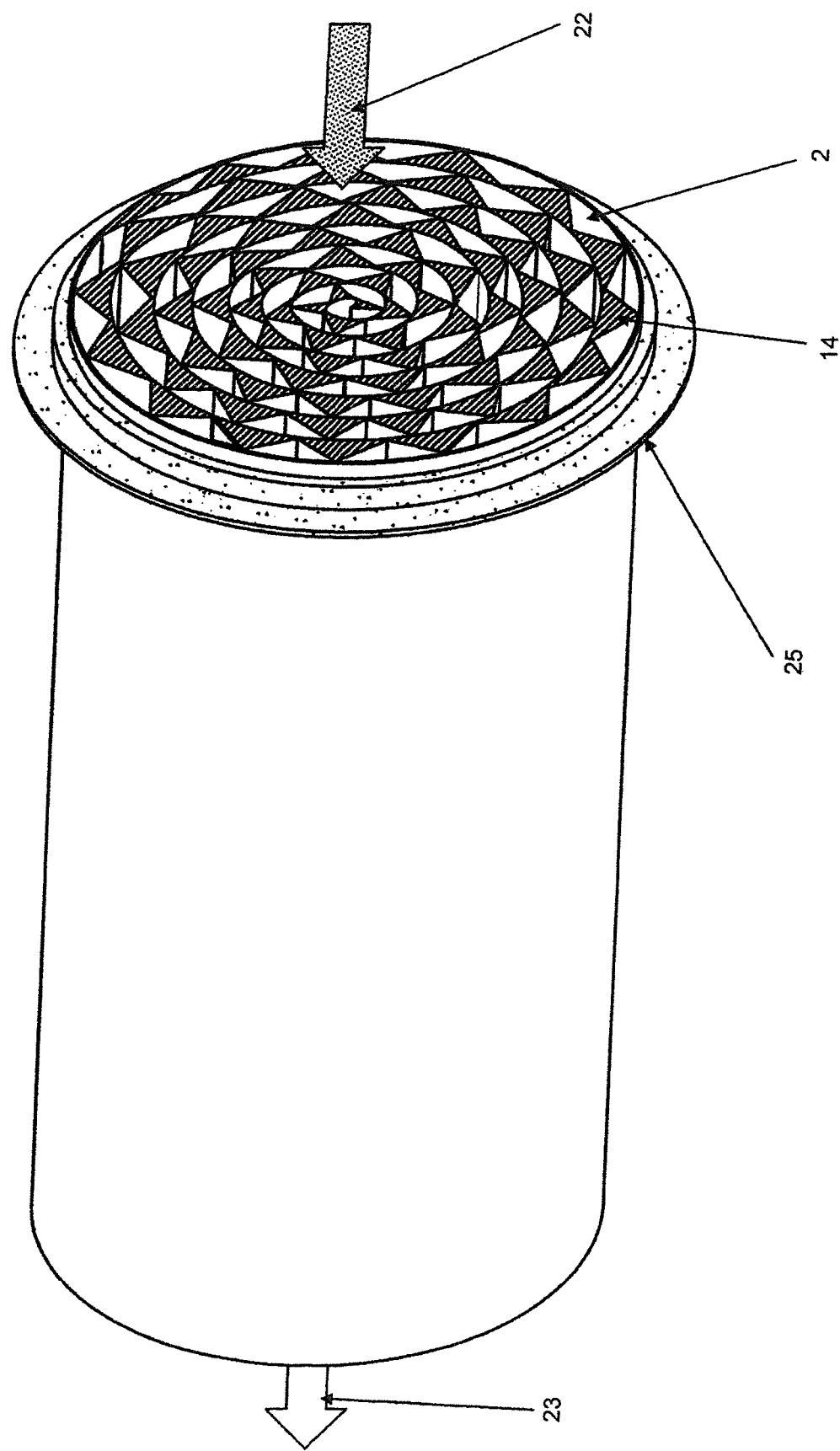
FIG. 3 shows a perspective view of a filter element.

FIG. 3 shows that the filter element according to the invention shown only in sections in FIG. 1 can through winding on some of the layers shown in FIG. 1 be wound into a compact filter element. A compact filter element of this type comprises an inlet side 22 towards which are directed the inlet openings of the first channels of the group of first channels. Additionally, a compact filter element of this type comprises an outlet side 23 towards which the outlet openings of the second channels of the group of second channels open. An annular projection 25 can be used to insert the filter element into a pot-shaped housing.

Figure 4:
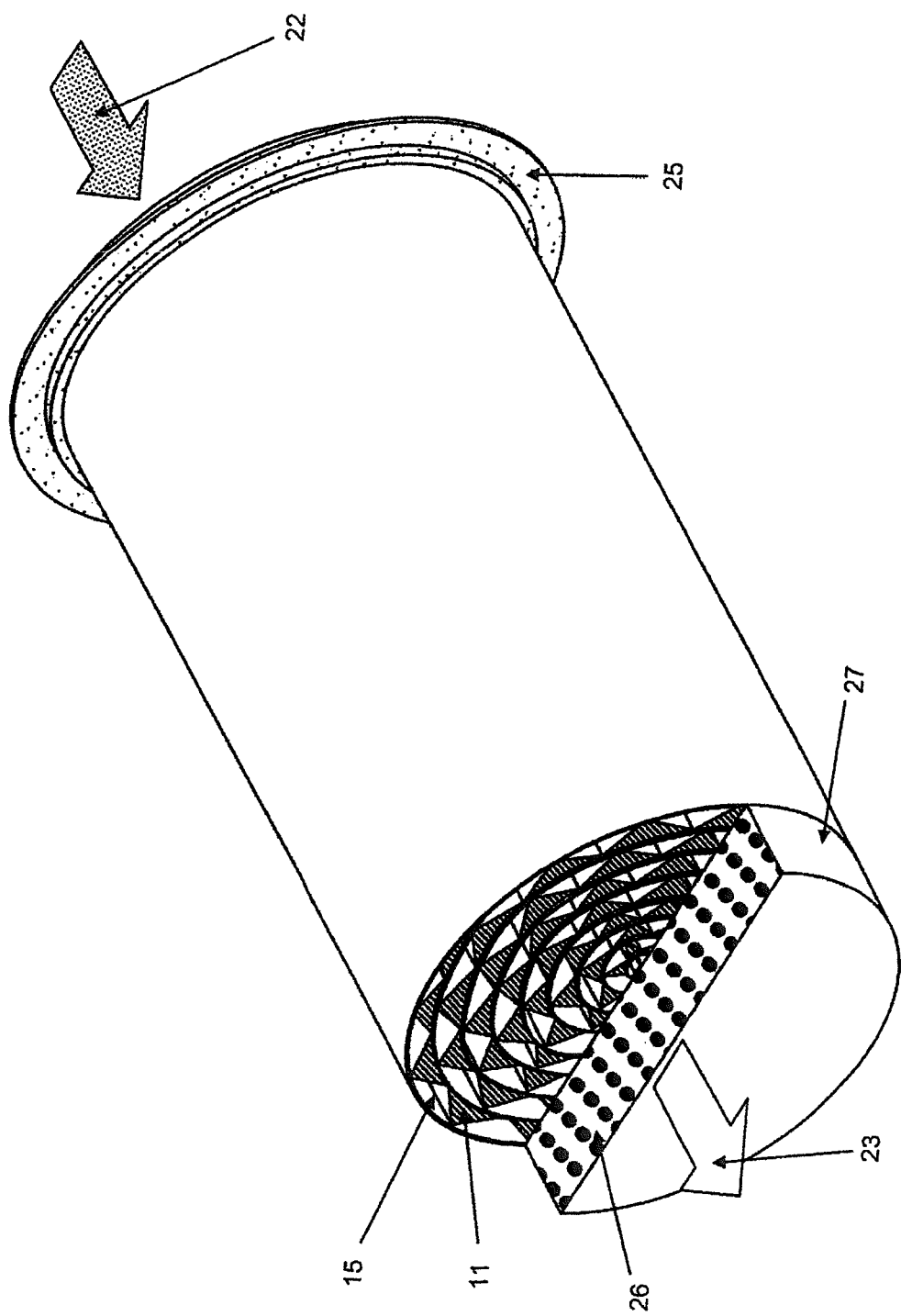
FIG. 4 shows a perspective view of a further filter element.

FIG. 4 shows that the filter element additionally or even alternatively to the second layer 20 of the filter medium (the layer of drainage medium) in the area of the outlet openings of the second channels 15 can have a drainage medium 26 in the form of a cylindrical disk-shaped closure 27.

The invention claimed is:

1. A filter element for filtering a fluid passing through the filter element; the filter element comprising:
    a group of first channels in which each first channel extends from a first end to a second end and each first channel has at its first end an inlet opening through which the fluid to be filtered can flow into the respective first channel and is closed at its second end, and
    a group of second channels, in which each second channel extends from a first end to a second end and each second channel has at its second end an outlet opening through which the filtered fluid can flow out of the respective second channel and is closed at its first end, wherein at least one first channel is arranged adjacent to a second channel and the first channel is separated from the second channel by a partition wall, wherein the partition wall is formed of a filter medium through which the fluid to be filtered can flow from the first channel into the second channel whereby the filter medium comprises a coalescence filter medium; and wherein the filter medium comprises several layers, whereby a first layer is a coalescence filter medium and a second layer is a drainage medium comprising a drainage layer, whereby the drainage layer directly adjoins a second channel, whereby the fluid to be filtered enters the first channel, and can only leave the first channel by passing through the partition wall of the first channel and the filtered fluid flows out of the respective outlet openings of the second channels, whereby the filtered fluid does not enter the second channels through any further opening, but via the partition wall;

further comprising a back element on which the partition wall separating the first channel from the second channel is fastened so that the first channel is delimited by a surface section of the back element and the surface of the partition wall facing it; and wherein the coalescence filter medium is a glass fiber medium, and the drainage layer is one of a glass fiber or polyester medium.

2. The filter element according to claim 1 wherein the filter medium has a first layer of a microfiber fleece which is arranged closer to the first channel and a second layer of a drainage medium which is arranged closer to the second channel.

3. The filter element according to claim 1 wherein in a plane which is perpendicular to longitudinal axis extending from the respective first end to the second end of the respective channel, the first channel and/or the second channel has/have a triangular or circular sector or segment-shaped cross-section.

4. The filter element according to claim 1 wherein each first channel is arranged adjacent to two second channels and the first channel is separated from the first of the two second channels by a first partition wall, and the first channel is separated from the second of the two second channels by a second partition wall, wherein the first partition wall and the second partition wall are each formed of a filter medium through which the fluid to be filtered can flow from the first channel into the second channel.

5. The filter element according to claim 1 wherein all first channels are delimited by a surface section of the back element assigned to the respective first channel.

6. The filter element according to claim 1 wherein the filter element is cylindrical and extends along a longitudinal axis and the longitudinal axis of a first and/or a second channel extending from the respective first end to the second end of the respective channel is arranged in parallel to the longitudinal axis of the filter element.

7. A coalescence filter with a filter element according to claim 6.

8. A compressed air filter system with a coalescence filter according to claim 7.

9. A method of filtering using a filter element according to claim 1 comprising:
filtering at least one of air having fluid aerosols, or a fluid having drops of a second suspended fluid.

10. A method of producing a coalescence filter including a step of introduction of a filter element according to claim 1 into the housing of a coalescence filter and as closing of the housing.

* * * * *